UNITED STATES PATENT OFFICE.

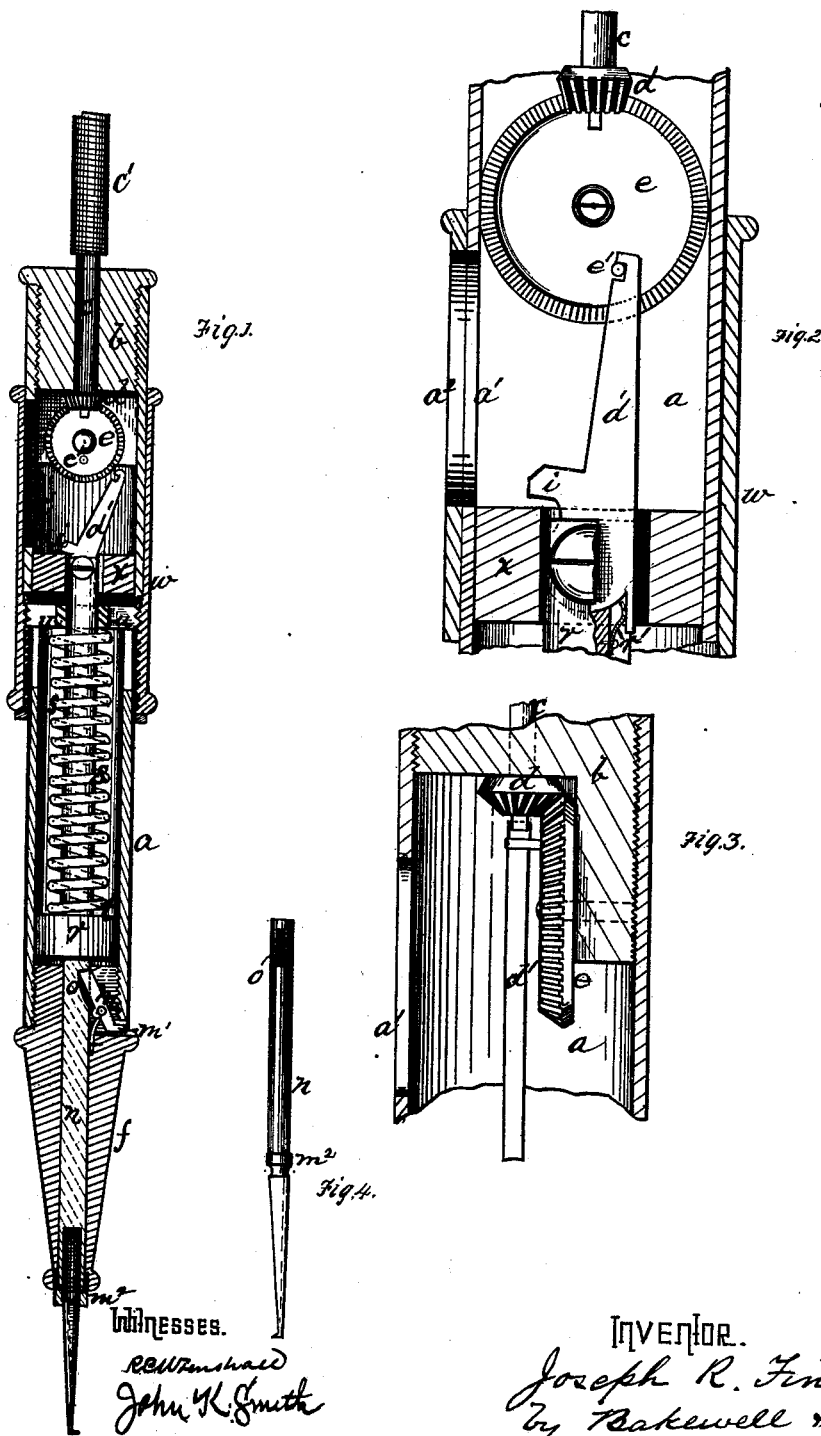

JOSEPH R. FINNEY, OF PITTSBURG, PENNSYLVANIA, ASSIGNOR TO HIMSELF AND LEE S. SMITH, OF SAME PLACE.

IMPROVEMENT IN DENTAL PLUGGERS.

Specification forming part of Letters Patent No. 197,261, dated November 20, 1877; application filed October 6, 1877.

*To all whom it may concern:*

Be it known that I, JOSEPH R. FINNEY, of Pittsburg, in the county of Allegheny and State of Pennsylvania, have invented a new and useful Improvement in Teeth-Pluggers; and I do hereby declare the following to be a full, clear, and exact description thereof, reference being had to the accompanying drawings, forming part of this specification, in which—

Figure 1 is an enlarged sectional view of a plugger embodying my invention. Fig. 2 is an enlarged detail view of the upper portion of the ram and the power-pinions. Fig. 3 is a similar view of the spring-dog, upper end of plunger, and diaphragm $x$.

Like letters refer to like parts wherever they occur.

My invention relates to the construction and operation of automatic mallets or pluggers for dental purposes; and consists in such an arrangement or combination of the ram plugging-tool and power that pressure upon the plugging-tool causes the ram to connect with the power which operates the ram so long only as the pressure on the tool exists, whereby an automatic relief is obtained when the tool is raised from contact.

It also consists in combining, with the ram, a spring dog or pawl and cam for automatically connecting and disconnecting the ram and power, according to the position of the ram, and in combining, with the spring-ram of an automatic mallet, a screw-sleeve and slide for controlling the spring, so as to increase or decrease the power of the mallet or ram at pleasure.

I will now proceed to describe my invention, so that others skilled in the art to which it appertains may apply the same.

$a$ indicates the hollow stem or handle, within which the operative devices are secured. It is closed at one end by a head, $b$, through which passes a short shaft, $c$, provided with a pinion, $d$, which gears with a bevel-pinion, $e$, arranged and journaled within and close to the end of hollow stem $a$. The exterior end of shaft $c$ is connected to a flexible shaft, $c'$. Upon one face of bevel-pinion $e$ is a pin projection or spur, $e'$, which serves to retract or lift the ram.

To the opposite end of stem $a$ is secured, in any suitable manner, a tapering sleeve, $f$, or continuation of the stem, in which is pivoted a dog or catch, $m$, whose end $m^1$ projects, so that the dog can be operated from the exterior, said dog being hung so as to engage with a recess or slot in the upper end of a detachable tool-holder. Within the sleeve $f$ is the detachable tool-holder $n$, constructed and adapted at one end to secure any suitable plugging-tool of known manufacture, said holder being retained in the sleeve by a recess, $o$, which engages with the dog $m$, while a shoulder, $m^2$, also serves to limit the motion of the tool-holder, the rotation of the tool-holder being prevented by the slot or recess $o$ and dog $m$. $r$ is a ram or piston arranged within stem $a$, and provided with a spiral or other suitable spring, $s$, one end of which rests against a shoulder or collar, $t$, on the ram, or is otherwise connected thereto, while the opposite end bears upon the under side of a follower, $u$, having arms which project through slots in stem $a$, are threaded upon their outer ends, and engage with an internally-threaded sleeve or nut, $w$, on the stem $a$. When the nut or sleeve $w$ is turned, the piston or follower $u$ is moved up or down, either compressing spring $s$ and increasing the power of the ram, or allowing the spring to expand and decreasing the power of the ram. This sleeve is usually extended up to a point above the slot $a^1$ in the hollow stem, and has a corresponding slot, $a^2$, so that by turning the sleeve the mechanism may be covered or exposed at will.

The ram or piston $r$, which is squared, flattened, or otherwise formed at its upper end to prevent it from turning, passes through the follower $u$, through an opening corresponding to its cross-section in a diaphragm, $x$, and is provided above the diaphragm with a spring dog or pawl, $d'$, pivoted thereto, and which, under certain conditions, engages with the spur or projection $e'$ on bevel-pinion $e$.

Upon pawl or dog $d'$ is a projection or spur, $i$, which engages with the partition or diaphragm $x$, said devices serving to throw the pawl out of the path of spur or projection $e'$, while secured to the end of ram $r$ is a spring, $r'$, which, when at liberty to act, brings the pawl $d'$ in line with the ram, and into the path of spur or projection $e'$. The point of connection between the ram and pawl $d'$ is so adjusted that when the ram is at the extent of its possible movement the pivoted end of the pawl will enter the slot in diaphragm $x$, permitting the spur or projection $i$ to encounter the diaphragm, deflecting the free end of the pawl, so as to carry it out of the path of spur or projection $e'$.

The operation of my devices is as follows: A suitable tool having been secured in tool-holder $n$, and power applied through flexible shaft $c'$, or otherwise, to rotate pinion $e$, the operator makes pressure upon the filling sufficient to force the ram up slightly, which carries the point of attachment of the pawl $d$ above diaphragm $x$, lifting the pawl, spur, or projection $i$ off of the diaphragm $x$, and permits the spring $r'$ to act, forcing the pawl into line with the ram, and into the path of spur or projection $e'$ upon pinion $e$, with which it engages. The ram is thus lifted, compressing spring $s$, and, upon gaining the full extent of the lift, the pawl $d'$ either escapes from spur $e'$ or is tripped by the journal of pinion $d$, (or by special devices for the purpose,) when the spring $s$ forces down the ram. This operation of the devices will continue so long as the tool-holder is pressed into the stem as far as the shoulders $m^2$ will allow it to go, or sufficiently far to raise the end of the ram (to which the pawl $d'$ is pivoted) above partition or diaphragm $x$. When the pressure upon the tool is relaxed the spring $s$ retracts the ram $r$, so as to bring the spur $i$ in contact with diaphragm $x$, and the pawl is at once deflected or disengaged from the pinion $e$, and the ram ceases to operate. When at rest the lower end of the ram $r$ is held against the tool-holder $n$ by the action of spring $s$, so that the tool-holder $n$ is quite firm when in its lower position, and can be used to insert and position the filling material.

The tool-holder $n$ has been especially designed to accommodate plugging and other tools of well-known manufacture; but in many cases I form a tool wherein the holder and point are in a single piece, as shown in Fig. 4, or, in other words, the tool with recess $o$ and shoulder $m^2$ to be inserted by itself, dispensing with the detachable holder.

The advantages of my invention are, that the power is automatically disconnected from the ram whenever pressure upon the plugging-tool is withdrawn, so that the tool can be used for inserting the filling material without first disconnecting the power, or without special attention thereto, as with the present power-pluggers, and the instrument is simple and compact.

Having thus described my invention, I claim and desire to secure by Letters Patent—

1. In a dental mallet or plugger, the combination of the power mechanism, the ram, and a device adapted to be intermittently connected to the power, said device pivoted to the ram, the whole adapted to be automatically operated by pressure on the plugging-tool, substantially as specified.

2. The combination, in a dental mallet, of power mechanism, spring-ram, dog, or pawl pivoted thereto, and devices, substantially as described, for deflecting the dog, so as to disengage it from the power by the retraction of the ram when the tool is relieved from pressure, substantially as described.

3. In an automatic dental mallet, the combination of the hollow stem, provided with a spring-ram and slotted screw-sleeve, adapted to both close the stem and control the power of the spring-ram.

4. The detachable tool or tool-holder, having the recess for the reception of a locking-dog, and the shoulder to limit the play of the tool in its holder, substantially as specified.

In testimony whereof I, the said JOSEPH R. FINNEY, have hereunto set my hand.

JOSEPH R. FINNEY.

Witnesses:
F. W. RITTER, Jr.,
JNO. K. SMITH.